Nov. 8, 1938.    F. W. SEYBOLD    2,135,917

AUTOMATIC TRANSMISSION

Filed Nov. 2, 1936    4 Sheets-Sheet 2

INVENTOR:
FREDERICK W. SEYBOLD.
BY

ATTORNEYS.

Nov. 8, 1938.    F. W. SEYBOLD    2,135,917
AUTOMATIC TRANSMISSION
Filed Nov. 2, 1936    4 Sheets-Sheet 3

INVENTOR:
FREDERICK W. SEYBOLD.
BY
ATTORNEYS

Patented Nov. 8, 1938

2,135,917

UNITED STATES PATENT OFFICE 2,135,917

AUTOMATIC TRANSMISSION

Frederick W. Seybold, Westfield, N. J.

Application November 2, 1936, Serial No. 108,712

37 Claims. (Cl. 74—260)

This invention relates to automatic variable speed transmissions or torque converters for the transmission of power and, in particular, to such transmissions as are particularly adaptable for use as automatic automobile transmissions for transmitting power at variable speed and torque ratios between the engine of the automobile and the drive shaft connected to the axles thereof.

It is an object of this invention to provide such a power transmission in which a low torque at high engine speed may be converted into a high torque at low axle speed, especially when starting an automobile from rest or when climbing a steep hill, without shifting of gears or toothed clutches, this being accomplished by smoothly accelerated action and without intermediate steps in transmission ratios.

It is a further object of this invention to provide such a power transmission unit in which the output or axle drive shaft may be made to rotate in opposite directions without the use of auxiliary gear set means.

It is a further object of this invention to provide such a power transmission unit in which the use of the ordinary type of clutch is eliminated, clutching action being provided by the mechanism of this invention in its normal operation.

It is a further object of this invention to provide such a power transmission unit in which the conventional gear shift lever is entirely eliminated and in which the speed variation and direction reversal are completely controlled by the movement of two pedals, wherein "forward", "reverse" and "neutral" positions are at the disposal of the operator.

It is a further object of this invention to provide such a power transmission unit wherein the transition from a low gear ratio to a high gear ratio is accomplished automatically without attention thereto, or manipulation thereof, on the part of the operator.

It is a further object of this invention to provide such a power transmission wherein the transition from a predetermined ratio to a lower ratio occurs at a substantially lower engine speed than that at which the reverse transition occurs.

It is a further object of this invention to provide such a power transmission unit which is so arranged that rotation of the axles in forward direction must cease and the car must be brought to a complete stop before the reverse mechanism can be operated to drive the car in reverse direction.

It is a further object of this invention to provide such a power transmission unit in which planetary gearing is employed to provide an infinite number of gear ratios through its function of providing a connection in the form of a gear train.

It is a further object of this invention to provide a power transmission unit wherein the loss of fluid through leakage is constantly supplied to the unit by the lubrication system of the engine to which the transmission unit is connected.

It is a further object of this invention to provide such a transmission unit wherein all relative rotation of the planetary gearing ceases and the whole mechanism rotates as a unit when it is in a high gear ratio, thereby reducing wear to the minimum.

It is a further object of this invention to provide such a transmission unit in which the advantages of planetary gear trains and hydraulic drive means are utilized to provide the ultimate flexibility of drive.

It is a further object of this invention to provide in such a transmission unit, means adapted to provide both planetary drive connection and hydraulic drive connection means.

These and other objects and advantages will appear from the following description taken in connection with the drawings.

Figure 1:
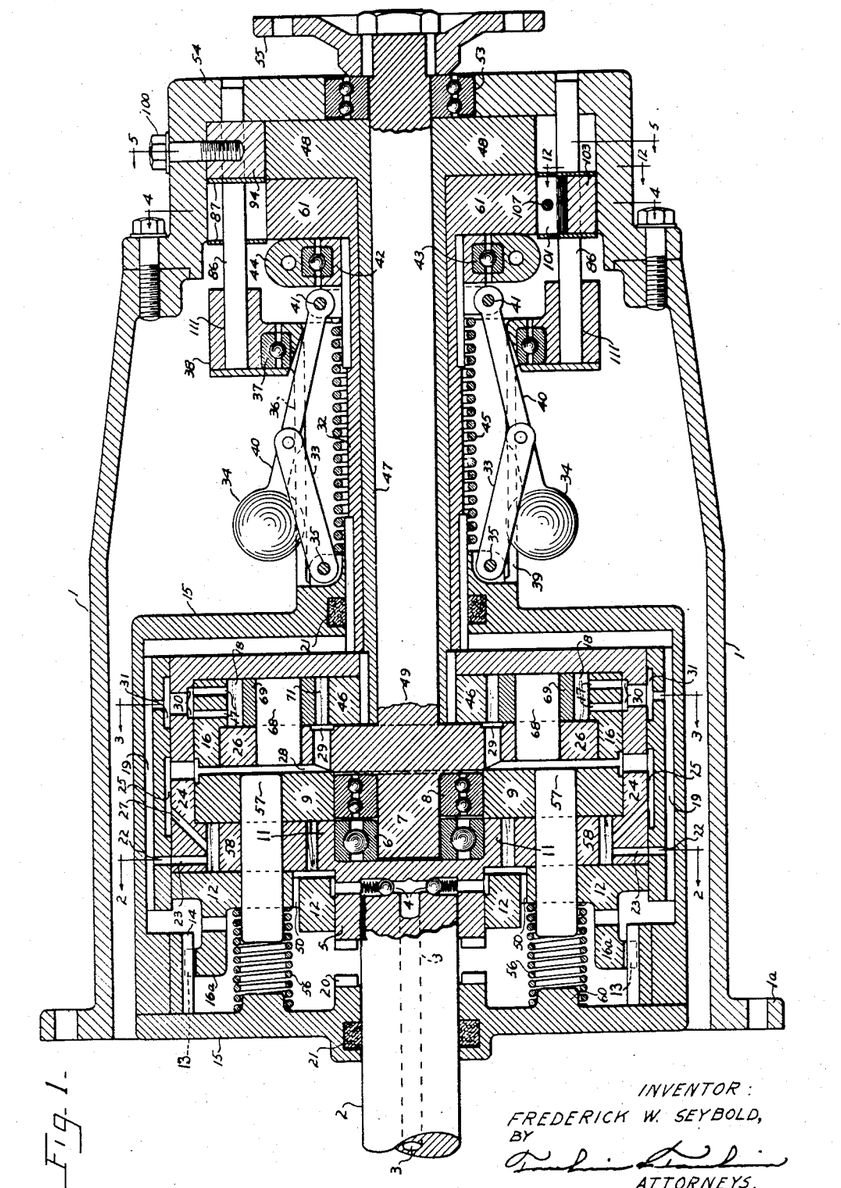
Figure 1 is a side elevational view, in vertical longitudinal section, through the power transmission unit, showing the parts in neutral position and with certain parts in elevation.

Referring to the drawings in detail, and in particular to Figure 1, the transmission unit comprises six assemblies, namely:

1. *Driving assembly*

The driving assembly comprises a driving pinion 11 tight on the driving shaft 2, which driving shaft is provided with an axial bore 3 for the passage of fluid from the force feed lubrication system of the engine or any other desired pressure fluid supply. Radial bores extend outwardly from the axial bore 3 of the shaft 2 and means in the form of balls 4 and springs are provided for preventing return flow of fluid from the transmission into the bore 3. Adjacent the pinion 11 and also fast on the shaft 2 is a jaw clutch 5 having teeth directed toward the engine and adapted to cooperate with other teeth, hereinafter described, to make the high ratio driving connection. The pinion 11 is provided with a recess adapted to support the ball bearing 6. The left end 7 of the driven shaft 49 is journaled in the inner raceway of the ball bearing 6. Mounted on the end 7 of the driven shaft 49 is a second ball bearing 8, upon which is rotatably supported the spider 9 of the planetary gear system of the secondary floating assembly, hereinafter described in detail.

2. *Secondary floating assembly*

The secondary floating assembly comprises the spider 9 having shafts 57 mounted thereon. Each of the shafts 57 supports a pinion 58 which fits accurately into a recess 10 (Figure 2) in the spider 9 to provide that degree of fluid tightness necessary in fluid gear pumps. A flanged disk 12 covers the pinions 57 and the pinion 11 and is freely rotatable on the hub of the jaw clutch 5. The flanged disk 12 is secured by bolts (not shown) to the spider 9 whereby to cooperate with the spider 9 to form the jump casing of an operative gear pump. The flanged disk 12 is provided at its left or forward end with external gear teeth 13 which cooperate with internal gear teeth 14 formed in the gear housing or shell 15. Spaced radial holes or apertures are provided in the cylindrical portion 16a of the flanged disk 12 to permit the passage of fluid contained in the gear housing or shell 15.

Figures 2, 3, 4, 5:
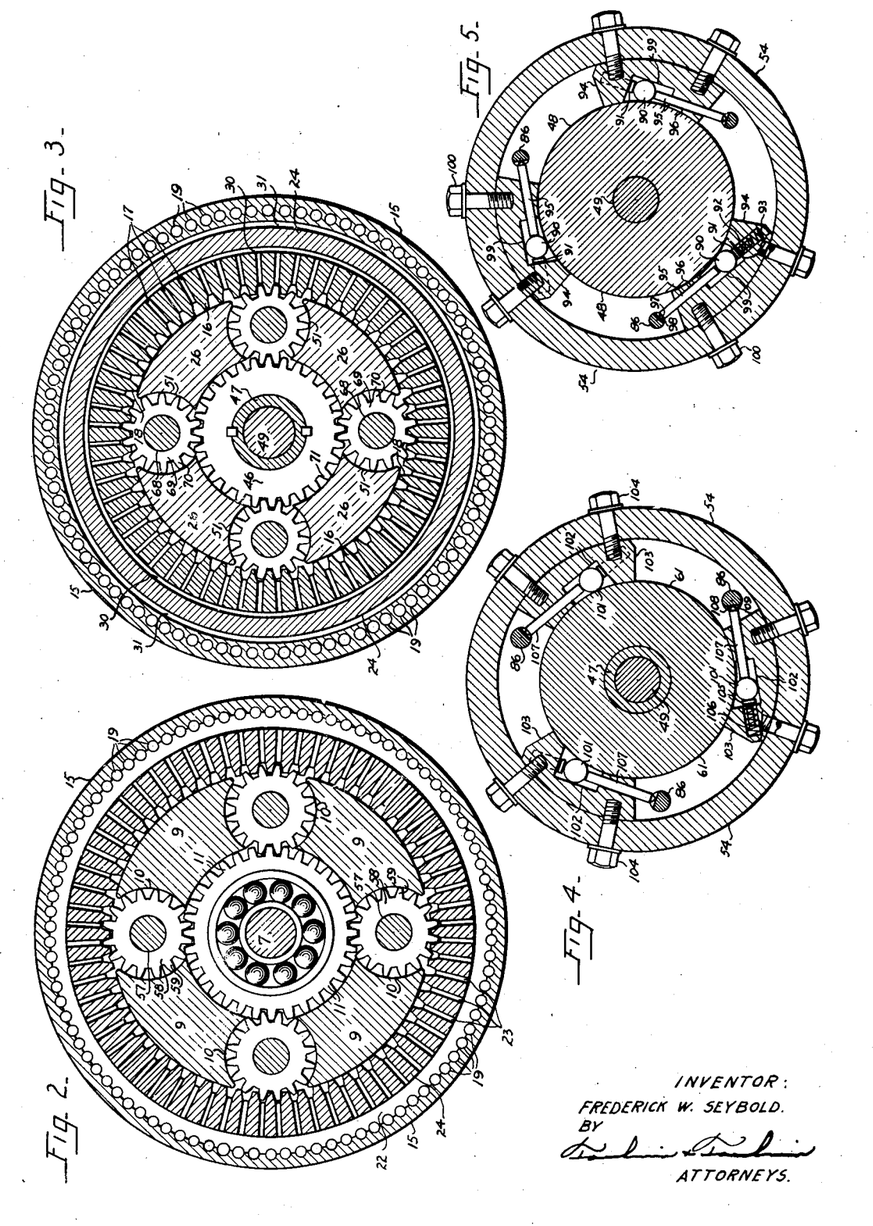
Figure 2 is a transverse sectional view taken along the line 2—2 of Figure 1.
Figure 3 is a similar view taken along the line 3—3 of Figure 1.
Figure 4 is a sectional view taken along the line 4—4 of Figure 1.
Figure 5 is a similar view taken along the line 5—5 of Figure 1.

The spider 9 is provided with a rightwardly extending flange having an internal gear 16 formed therein and in which flange is provided a large number of discharge passages 17 disposed between the teeth 18 (Figure 3). The shell 15 which surrounds the greater part of the mechanism and provides a container for fluid supplied through passage 3 in the driving shaft 2, is provided with a large number of longitudinal passages 19 which provide for the transfer of fluid from one side to the other of the shell when the shell 15 is shifted axially of the driving shaft 2 and driven shaft 49 by the flyball governor 34.

Jaw clutch teeth 20 are provided on the lefthand or forward wall of the shell 15 and are adapted to cooperate with the teeth of the jaw clutch 5 to establish high ratio drive when the shell 15 is shifted axially to the right with respect to the drive shaft 2 and driven shaft 49 to engage the teeth 5 and the teeth 20. Suitable oil seals 21 are provided in the shell 15 to reduce leakage of fluid from the shell 15 to the crankcase.

It is to be noted that, when the teeth 5 and teeth 20 are in engagement, the shell 15 is connected directly with the driving shaft 2 and, as will appear most clearly from the following description, relative motion between the shell 15 and enclosed gearing is then obviated, the drive being direct from the driving shaft 2 through the shell 15 to the driven shaft 49. It is likewise to be understood that by the provision of the passage 3 in the driving shaft 2, which passage is connected to the interior of the shell 15, leakage of fluid from the shell 15 is made up whereby the shell 15 is constantly completely filled with fluid.

The annular recess 22, in the inner wall of the casing 15, connects the discharge ports 23 (Figure 2) in the internal gear of the primary assembly, hereinafter more fully described, with the passages 19 in the shell 15. An annular recess 25 of predetermined width formed on the inner surface of the shell 15 serves as a passageway for fluid supplied through the ports in the internal gears 24 and 16 to the spider 26 of the driven assembly (hereinafter more clearly described) from the inclined discharge ports 27 formed in the internal gear 24 of the hereinafter described primary floating assembly. This fluid, which is under pressure, is fed through ports 28 and recess 29 in the spider 26 to the pinions 69 which rotate on the shaft 68, which are fast in the spider 26 and which, together with the sun pinion 71 of the primary floating assembly and the internal gear 16 of the secondary floating assembly, constitute a fluid motor and a fluid pump, discharging the fluid through the discharge passages 17 (Figure 3) into the annular recess 30 of predetermined width, the latter communicating with the passages 19 of the shell 15 through the annular recess 31 in the shell 15. The shell 15 rotates freely on the driving shaft 2 and is slidably keyed on the sleeve extension 32 of the clutching locking disk 61.

The links 33 of the flyball governor 34 are pivotally supported on pins 35 attached to the shell 15. The shell 15 is provided with a hollow cylindrical extension 36 at the rear or righthand end of which is mounted a ball bearing 37, which carries the governor lock plate 38. The extension 36 of the shell 15 is provided with slotted openings 39 adapted to permit free movement of the flyball governor arms 40 which are pivoted on pins 41 of the sliding collar 42, which collar is splined on the sleeve extension 32. The sliding collar 42 supports a ball bearing 43, upon which is mounted the collar 44 which is actuated by the pedal control assembly mechanism in a manner hereinafter more clearly described. A coil spring 45 having one end in engagement with the shell 15 and the opposite end in engagement with the sliding collar 42 produces the effect of a spring loaded governor. Additional springs 56 having one end in engagement with the inner forward or lefthand wall of the shell 15 and the opposite end in engagement with the flange disk 12 and supported by lugs 60, integral with the wall of the shell 15 and the extensions of pinion shafts 57, tend to urge the shell 15 leftwardly with respect to the flanged disk 12, the drive shaft 2, the driven shaft 49 and the crankcase and other stationary parts.

3. Primary floating assembly

The primary floating assembly comprises the deep internal gear 24 which, together with the sun pinion 46, is keyed to the sleeve extension 47 of a roller clutch locking disk 48, the sleeve extension and the clutch locking disk 48 being supported for free rotation on the driven shaft 49.

The internal gear 24 is provided with radial discharge ports 23 between the teeth of the internal gear portion thereof and also inclined discharge ports 27 and an annular recess 30 of predetermined width, as described above, a series of ports connecting the recess 30 with the recess 31.

4. Driven assembly

The driven assembly comprises the spider 26 formed integrally with the driven shaft 49 having fixed thereto pins 68, upon which are mounted for free rotation pinions 69 which fit accurately into bored recesses 51 of the spider 26. The tightness of fit between the pinions 69 and bored recesses 51 provides for the operation of the pinions 69 with the bored recesses 51, as a gear motor and pump. The teeth 70 of the pinion 69 mesh with the teeth 71 of the sun pinion 46. The teeth 70 also mesh with the teeth 18 of the internal gear 16 (Figure 3).

The driven shaft 49 has the left or forward end extension 7 thereof journaled in the ball bearing 6, as before described, and the right or rear end portion thereof is supported by the ball bearing 53, which ball bearing is supported in the housing cap 54. The right end portion or rear end portion of the driven shaft 49 has splined thereon the flange member 55 which is adapted to be suitably connected to the propeller shaft of the automobile, to which the invention is applied. The housing cap 54 is rigidly mounted by means of stud bolts to the transmission casing which is rigidly connected to the engine and which serves as an extension of the crankcase thereof as well as a housing for the transmission unit.

5. Control assembly

The control assembly of the transmission unit comprises a pair of locking clutches together with the flyball governor and suitable pedals operatively connected therewith.

Figures 8, 12, 13, 14:
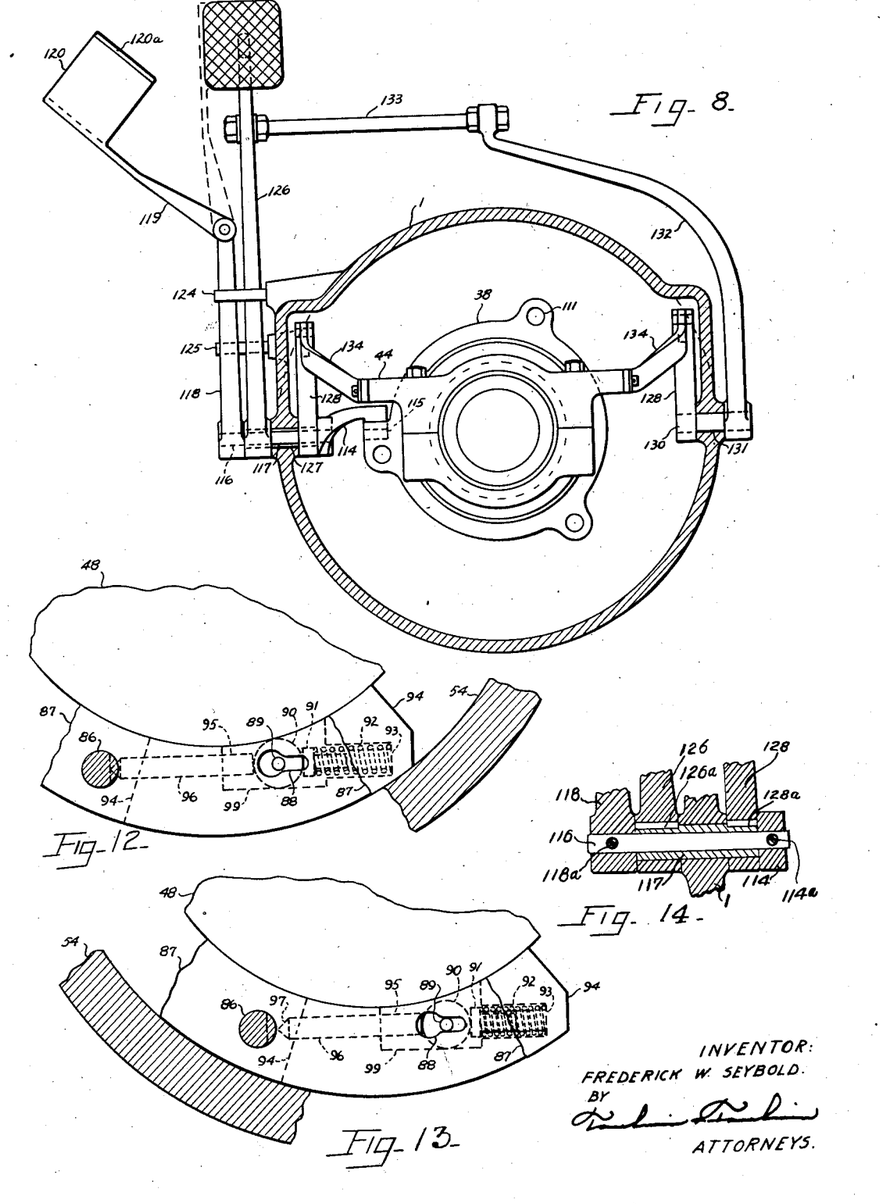
Figure 8 is a rear elevational view, partly in section, of the structure shown in Figures 6 and 7.
Figure 12 is a fragmentary detail view of structure shown in Figure 5, illustrative of means for eliminating wear on the locking clutch rollers, and showing a roller in engagement with the roller clutch locking disk.
Figure 13 is a view similar to Figure 12, but showing the roller withdrawn from engagement with the roller clutch locking disk.
Figure 14 is a fragmentary enlarged view, in section, taken on the line 14—14 of Figure 6.

The roller clutch locking disk 48 of the primary floating assembly (Figures 1 and 5) has the sleeve extension 47 integrally formed therewith. The roller clutch locking disk 48 is mounted for free rotation on the driven shaft 49. The roller clutch locking disk 48 is adapted to be engaged by the clutch rollers 90 which are provided at each end with trunnions 89 which project into slots 88 (Figures 12 and 13) of the roller retaining plates 87. The slots are of such shape as to guide the rollers 90 away from the roller clutch disk 48 when the releasing pins 95 urge the rollers 90 in a direction opposite the compression springs 92. The rollers 90 are supported in cut-away portions 99 in the stationary clutch members 94 which are secured to the stationary housing cap 54 by means of bolts 100.

The releasing pins 95 and the springs 92 are mounted in substantially coaxial bores in opposite sides of the cut-away portion 99 in the stationary clutch members 94. The springs 92 constantly urge the rollers 90 toward engagement with the clutch locking disk 48 because of the inclination of the outer wall of the cut-away portion 99. The releasing pins 95 are adapted to be moved axially with respect to the stationary clutch members 94 by engagement of surfaces of the slidable control rods 86 with the pointed ends thereof. The control rods 86 have notches suitably disposed thereon whereby, when the notches are engaged by the pointed ends 97 of the releasing pins 95, the springs 92 will be permitted to urge the rollers 90 into wedging engagement between the stationary clutch members 94 and the clutch locking disk 48.

The trunnions 89, in the engaged position of the rollers 90, are permitted to have substantial movement by the enlargements provided in the slots 88. In the disengaged positions, the trunnions 89 are guided by the narrow portions of the slots 88, whereby accidental engagement of the rollers 90 with the clutch locking disk 48 is effectively prevented (see Figures 12 and 13). This arrangement prevents the wearing of flats upon the peripheral surfaces of the rollers 90.

With reference to Figure 5, the direction of rotation of the driving shaft 2 would be counterclockwise, as seen in that figure. By means of the stationary clutch members 94 and the rollers 90, when the releasing pins 95 are in releasing position and their pointed ends 97 engaged in slots in the control rods 86, counterclockwise rotation of the clutch locking disk 48 is permitted, while clockwise rotation thereof will cause the rollers 90 to be engaged between the inclined cutaway portion 99 and the clutch locking disk 48, whereby to effectively lock the disk 48 to the stationary clutch members 94. The stationary clutch members 94 being rigidly secured to the stationary housing cap 54, clockwise rotation of the clutch locking disk 48 is effectively prevented.

With reference particularly to Figure 4, it will be seen that stationary clutch members 103, similar to the stationary clutch members 94, have been provided in alignment with the locking clutch disk 61. These stationary clutch members 103 are provided with cut-away portions 102, similar to the cut-away portions 99 of the stationary clutch members 94. The cut-away portions are, however, oppositely directed. In these cut-away portions 102, rollers 101, similar to the rollers 90, are disposed and urged in one direction by the plungers 107 similar to the plungers 95 and having their sharp ends 108 adapted to engage surfaces of the same control rods 86 as engage the pointed end portions of the releasing pins 95.

Springs 106, similar to the springs 92, are mounted coaxially with respect to the pins 107 in the same manner in which the springs 92 are mounted with respect to the pins 95. The rollers 101 are provided with suitable trunnions, similar to the trunnions 89, which are mounted in the same manner as the trunnions 89 and for the same purpose. Due to the reversed position of the stationary clutch members 103, clockwise rotation of the locking clutch disk 61 is permitted, while counterclockwise rotation thereof is prevented, when the releasing pins 107 are in released position, having their pointed ends disposed in a suitable slot in the respective control rods 86. The locking clutch disk 61 is integral with the sleeve extension 32, with which the shell 15 is connected by spline means.

The control rods 86 are anchored, as in the bores 111, to the slidable but non-rotatable governor lock plate 38 (Figure 1). The governor lock plate 38 is provided with a notched portion 113 (Figure 6), movable therewith and adapted to engage the hook member 115 of the neutral treadle arm 114 when the two are opposite one another. The neutral treadle arm 114 is rigidly secured by means of pin 114a to the short shaft 116 which is supported for rotation in the hollow shaft 117. The L-shaped neutral treadle lever 118 (Figures 6, 7 and 14) is made fast by means of pin 118a to the opposite end of the shaft 116, and its upper end is provided with a pivoted connection 119, to which is attached the neutral pedal 120 having a pedal pad provided with a side flange 120a. A torsion spring 121 connected between the neutral treadle lever 118 and the pedal 120 urges the latter in counter-clockwise direction.

A tension spring 122, one end of which is attached to the lever 118 and the other end of which is anchored to the floor boards 123, urges the lever 118 upwardly into engagement with a suitable pin 124 which is rigidly attached to the transmission housing. The lower stop pin 125 limits the downward motion of the neutral treadle lever 118. Secured to the outside end of the hollow shaft 117, by means of key 128a is the control pedal 126. The hollow shaft 117 is supported by a bearing 127 in the transmission case and, in turn, provides a bearing for supporting the short shaft 116.

Figures 6, 9, 10:
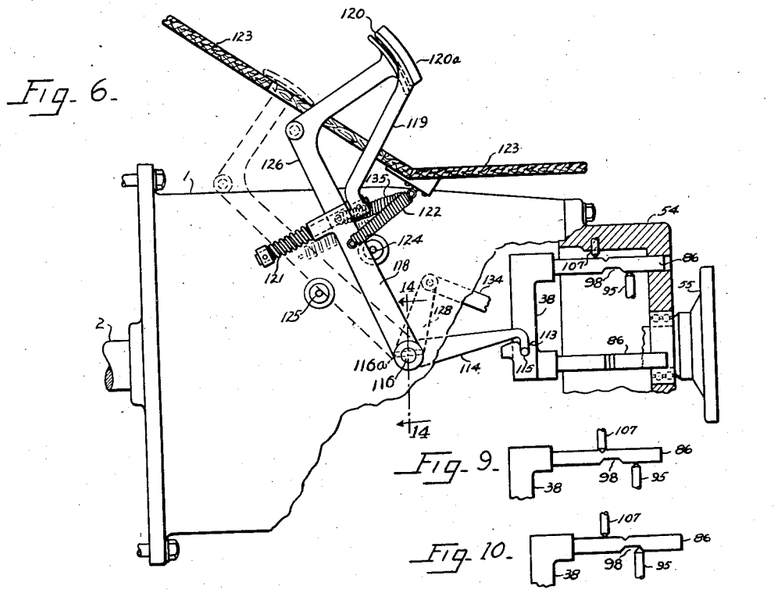
Figure 6 is a side elevational view, partly in section, of a portion of the transmission unit showing the foot pedal control means.
Figure 9 is a fragmentary diagrammatic view illustrating the position of the clutch control rods when the parts of the unit are in position for "reverse" operation.
Figure 10 is a view similar to Figure 9, but with the parts in position for "low" gear ratio operation.
Figures 7, 11:
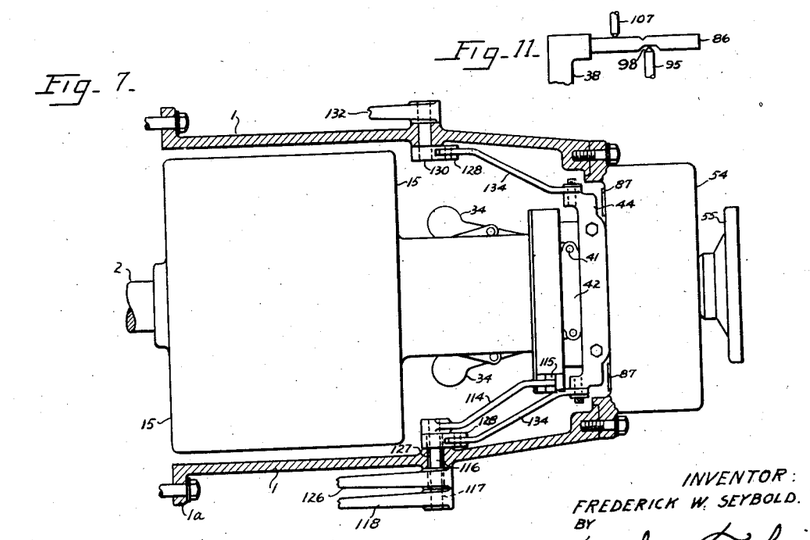
Figure 7 is a plan view of the structure shown in Figure 6, partly in section, and with certain parts broken away in the interest of clearness.
Figure 11 is a view similar to Figures 8 and 9, but with the parts in position for "high" gear ratio operation.

On the inner end of the hollow shaft 117 is secured the fork lever 128. A similar fork lever 128 is pivotally mounted upon the fulcrum pin 130 on the opposite side of the transmission case. The fulcrum pin 130 is provided with a bearing 131 coaxial with the bearing 127 on the opposite side of the transmission case. An auxiliary lever 132 is fast to the pin 130 and is connected with the control pedal 126 by the tie rod 133 (Figure 8), whereby the levers 128 are caused to move in unison when the control pedal 126 is depressed. Links 134 connect the levers 128 with the collar 44 of the flyball mechanism which is supported on the ball bearing 43. The stop pins 124 and 125, in addition to limiting the movement of the neutral treadle lever 118, also limit the movement of the control pedal 126; the control pedal 126 is urged upwardly by the tension spring 135 which is connected at one end to the pedal 126 and at the other end to the floor boards 123 (Figure 6).

6. Transmission case

The transmission case (Figures 1, 6, 7 and 8) comprises an annular casting 1 provided at its forward end with a flanged portion 1a adapted to be bolted to the driving motor. As shown, the rear end portion of the annular casting 1 is reduced and has the housing cap 54 rigidly secured thereto by means of cap or stud bolts. Other suitable constructions may, of course, be utilized.

It is thus seen that the automatic variable speed transmission unit of my invention comprises six assemblies, namely, the drive assembly, the secondary floating assembly, the primary floating assembly, the driven assembly, the control assembly, and the transmission case.

Operation

A. *Idling or "neutral" position.*—To cause the transmission unit of my invention to operate in the idling or "neutral" position, whereby power from the engine shaft 2 will not be transmitted to the output shaft 7 and driven shaft 49, it will be assumed that the brakes are applied whereby to lock the axles of the car and also that the "neutral" hook 115 has been dropped into the notch 113 (Figure 6), the engine is started in the usual manner, whereupon the driving shaft 2 and pinion 11 rotate in counterclockwise direction, as viewed from the operator's seat and as seen in Figures 2, 3, 4 and 5. The planetary spider 26 is locked in fixed position, because of its direct connection with the locked axles of the vehicle through the driven shaft 49 with which it is integral. The secondary floating assembly consisting of the planetary spider 9, the planetary pinions 58, internal gear 16, shell 15, flyball governor 34 and locking disk 61 then rotates in a counterclockwise direction. The rate of rotation may, for an appropriate given ratio of numbers of teeth, be one-seventh of the engine speed.

Meanwhile, the primary floating assembly, consisting of internal gear 24, sun pinion gear 46 and clutch locking disk 48, rotates at twice the speed of a secondary floating assembly above described, but in opposite or clockwise direction, at two-sevenths of the engine speed. Consequently, this results in the speed of the driven assembly becoming zero. Therefore, no driving power is delivered to the wheels of the car.

It will, of course, be assumed that the clutch releasing pins 95 and 107 are in the position illustrated diagrammatically in Figure 6. In this position of the pins 95 and 107, the rollers 99 are in inoperative position with respect to the clutch locking disk 48. The rollers 101 are in inoperative position with respect to the locking clutch disk 61. The clutch locking disk 48 and locking clutch disk 61 are freely rotatable with respect to the transmission casing.

So long as the car is in "neutral" position, the control pedal 126 cannot be depressed until the governor lock plate 38 is first released by depressing the "neutral" pedal 120 with the left foot. While the car is in neutral position, the engine can be raced for warming up and the car will begin to move forward only after the governor lock plate 38 has been released in the manner pointed out above.

B. *Forward motion in low gear.*—To set the car in motion in low gear, the brakes of the car are released in the ordinary manner, whereby to free the axles of the car and hence free the output shaft 7 and driven shaft 49. The driven shaft 49 has a driven assembly connected thereto and terminating in the planetary spider 26 which is integral with the driven shaft 49. The planetary pinions 69 are rotatably supported on the pins or short shafts 68 which are fixed in the planetary spider 26.

After the axles and driven shaft 49 are freed by releasing the brakes, the neutral pedal 120 is depressed whereby to release the governor lock plate 38. At the same time, the operator opens the throttle whereby to increase the speed of the engine and of the driving pinion 11. As the driving pinion 11 is drivingly connected to the secondary floating assembly, the flyball governor 34 rotates at an increased speed, causing displacement of the control rods 86.

Due to the rotation of the pinion 11 and the intermediate mechanism, the driving reaction on the primary floating assembly, with its internal gear 24 and sun pinion gear 46, is in clockwise direction. This tendency to rotate clockwise is prevented by the roller clutch locking disk 48, the rollers 90 of which have been released by the action of the releasing pins 95 moving into the long notches 98 of the control rods 86, whereby this clutch is in full operation. It will be recalled that, under these conditions, the clutch disk 48 can rotate only in counterclockwise direction; therefore, it is locked firmly to the transmission casing by the clockwise driving reaction against the primary floating assembly.

The drive from the driving shaft or engine shaft 2 to the driven shaft 49, which is connected to the axles of the car, is now through gears only and the power loss is extremely small. The secondary floating assembly including the planetary spider 9 with the planetary pinions 58, internal gear 16, shell 15, flyball governor 34 and the clutch locking disk 61 now rotates at one-third engine speed in the same direction as the driving pinion 11. This direction is counterclockwise. Since the primary floating assembly, including internal gear 24, sun pinion 46 and clutch locking disk 48, is locked in a stationary position in the manner just described, the planetary spider 9, through the engagement of its teeth with the pinion 69 of the planetary spider 26, drives this spider 26 two-thirds of its speed and in the same direction. Thus, the planetary spider 26 is now rotating at two-ninths of the speed of the engine drive shaft 2 and in the same, or counterclockwise, direction.

The torque of the driven assembly, including the planetary spider 26 and the driven shaft 49, is now, therefore, four and one-half times as great as the torque of the flywheel or crankshaft.

Accordingly, neglecting losses of power in the transmission, the horsepower of the engine crankshaft or driving shaft 2, which is delivered to the output or driven shaft 49, is expressed by the following formula:

$$\frac{2\pi t N}{33{,}000} = \frac{2\pi T n}{33{,}000}$$

where
$t$=driving (engine) torque, in inch pounds.
$T$=torque of the driven assembly, in inch pounds.
$N$=speed of engine in R. P. M.
$n$=speed of driven assembly in R. P. M.

*C. Transition speeds from "low" to "high" speeds.*—Meanwhile the pinions 58 continue to discharge fluid through ports 23 and 27. As the speed of the flyball governor 34 increases, the shell 15 is moved to the right whereby to close off the ports 23, which leaves only the ports 27 to provide egress for the fluid discharged by the planetary gearing 11, 58 and 24. The locking disk 48 is locked against clockwise rotation. Movement of the shell to the right to close off the ports 23, as above described, decreases the orifice area provided for escape of fluid and, as the latter system (including gearing 11, 58 and 24) tends to discharge to the slower moving planetary system (comprising gears 46, 69 and 16) fluid at a greater rate than the rate at which the slower moving planetary system may carry the fluid away through ports 27 alone, a pressure will be built up between the two planetary systems, which will react between them to vary the rate of relative rotation between the systems and a consequent change of speed in the secondary assembly as well as in the driven elements results.

This cumulative effect results in further constriction in the discharge ports 27 and 17 until they finally become completely closed, the shell 15 having moved sufficiently to the right to engage the clutch teeth 20 thereof with the clutch teeth 5 of the driving pinion 11, whereby to establish "high" ratio drive. Fluid which is then discharged into the passages 19 passes through the ports in the portion 16a to the intake ports 50 and to the pinions 11 and 58.

If it becomes desirable to reduce the speed of the car and increase the torque of the driving wheels, the control pedal 126 is depressed sufficiently to unlock the clutch teeth 20 and 5 through movement of the governor 34 and shell 15 to the left, the position of the flyballs of the governor 34 being undisturbed for the moment and planetary action of the pinions 58 and 69 commencing to pump fluid whereby a transmission ratio will be established to meet the torque requirement.

To stop the car or slow it down quickly, while the car is running in "high" speed with clutch teeth 5 and 20 locked, the control pedal 126 is depressed to its extreme downward position, whereby to unlock teeth 20 and 5 and open all discharge ports wide. At the same time, of course, the right foot has been removed from the accelerator pedal and placed upon the foot brake so that the vehicle wheels are partially or wholly locked. This action correspondingly retards or halts the rotation of the driven assembly with the spider 26 and pinions 69. When the speed of the car is reduced sufficiently, the hook 115 of the treadle arm 114 drops into the notch 113 of the governor lock plate 38, whereby to interlock the shell 15 with the former in such a manner as to prevent the transmission unit from being placed in reverse. Therefore, it will be seen that the car must be brought to a complete stop before its direction may be reversed.

*D. Operating the transmission in "reverse".*—To place the transmission unit in "reverse" and cause the car to move rearwardly, the "neutral" pedal 120 is swung over the control pedal 126 by bearing, with the left foot, to the right against the flange 120a and then depressing both pedals 120 and 126 with the left foot. This shifts the governor lock plate 38 with the control rods 86 into the position shown in Figure 9. In this position, the clutch roller releasing pins 95 have disengaged the rollers 90, whereas the clutch rollers releasing pins 107 do not oppose the wedging action of the rollers 101 between the faces of the cut-away portion 102 and the disk 61. As a consequence, the roller clutch locking disk 48 is released so that the primary floating assembly, including the internal gear 24 and the sun pinion gear 46, is permitted to rotate in clockwise direction. This results in rotating the driven assembly, including the spider 26 and pinion 69, in clockwise direction at one-sixth engine speed whereby to cause the car to move rearwardly. While this occurs, the roller clutch locking disk 61 is locked against counterclockwise motion of the secondary floating assembly including the planetary spider 9, internal gear 16, pinion 58, shell 15, and governor 34.

Roller clutch operation

From the above description, it will be seen that the roller clutches can each prevent rotation in one direction only when they are in operating position, as when the releasing pins 95 do not oppose the wedging action of rollers 90, clockwise rotation of disk 48 is prevented. Likewise, when releasing pins 107 do not oppose the wedging action of rollers 101, rotation of disks 61 in counterclockwise direction is prevented. Counterclockwise rotation of disk 48, whether rollers 90 are wedged or free, is possible. Likewise, clockwise rotation of disk 61 is possible whether rollers 101 are wedged or free.

Summing up the various positions of the locking clutches, the operation will be as follows:

A. For "neutral" operation.—Both of the clutch locking disks 48 and 61 will be released, as shown diagrammatically in Figure 6.

B. For "low" speed.—Locking disk 48 will be locked and locking disk 61 will be free, as shown diagrammatically in Figure 10.

C. For "high" speed.—No change from "low" position occurs, releasing pins 95 remaining in the depressions of the rods 86, as illustrated diagrammatically in Figure 11.

D. For "reverse" operation.—Locking disk 48 will be unlocked and locking disk 61 will be locked, as illustrated diagrammatically in Figure 9.

It is, of course, to be understood that the above-mentioned speed ratios are merely illustrative and depend only upon the number of gear teeth in the respective gear elements of the transmission unit. It will likewise be understood that the description and drawings are merely illustrative in this respect and that it is comprehended that the ratios may be widely varied without departing from the principles of my invention. It is furthermore to be understood that either one or both of the spur type planetary gear trains may, when desired, be replaced by bevel gears.

It is further to be understood that the transmission unit of my invention can be operated with a clutch interposed between the engine crankshaft and the transmission unit, when found desirable.

The above described structure is merely illustrative of one manner in which the principles of my invention may be utilized, and it is clearly to be understood that I desire to comprehend within my invention such modifications as come within the scope of the claims and the invention.

Having thus fully described my invention, what I claim as new and desire to secure by Letters Patent is:

1. In a transmission unit, a drive shaft having pinion means thereon, a casing rotatably supported on said drive shaft, a driven shaft rotatable with respect to said casing and having a driven assembly rotatable therewith and disposed in said casing, a primary floating assembly in said casing haveing a planetary connection with said driven assembly, a secondary floating assembly slidably connected to said casing having planetary connections with said primary floating assembly, said driven assembly and said drive shaft pinion means, and means operable to lock one of said floating assemblies against rotation in one direction or the other floating assembly against rotation in the opposite direction to cause low ratio rotation of said driven shaft in one or the other direction.

2. In a transmission unit, a drive shaft having pinion means thereon, a casing rotatably supported on said drive shaft, a driven shaft rotatable with respect to said casing and having a driven assembly rotatable therewith and disposed in said casing, a primary floating assembly in said casing having a planetary connection with said driven assembly, a secondary floating assembly slidably connected to said casing having planetary connections with said primary floating assembly, said driven assembly and said drive shaft pinion means, and means operable to lock one of said floating assemblies against rotation in one direction or the other floating assembly against rotation in the opposite direction to cause low ratio rotation of said driven shaft in one or the other direction, said last named means being operable to simultaneously release both said floating assemblies for rotation of said drive shaft, said casing and said floating assemblies without rotation of said driven assembly and said driven shaft.

3. In a transmission unit, a drive shaft having pinion means and jaw clutch means thereon, a casing having jaw clutch means adapted to be engaged with said first jaw clutch means for high ratio connection, said casing being slidably and rotatably supported on said drive shaft, a driven shaft rotatable with respect to said casing and having a driven assembly rotatable therewith and disposed in said casing, a primary floating assembly in said casing having a planetary connection with said driven assembly, a secondary floating assembly slidably connected to said casing having planetary connections with said primary floating assembly, said driven assembly and said drive shaft pinion means, and means operable to lock one of said floating assemblies against rotation in one direction or the other floating assembly against rotation in the opposite direction to cause low ratio rotation of said driven shaft in one or the other direction, and means for sliding said casing axially of said drive shaft to engage said complementary jaw clutch means for high ratio rotation of said driven shaft.

4. In an automatic transmission unit, a drive shaft having pinion means and jaw clutch means thereon, a casing having jaw clutch means adapted to be engaged with said first jaw clutch means for high ratio connection, said casing being slidably and rotatably supported on said drive shaft and normally resiliently urged in a direction to separate said jaw clutch means, a driven shaft rotatable with respect to said casing and having a driven assembly rotatable therewith and disposed in said casing, a primary floating assembly in said casing having a planetary connection with said driven assembly, a secondary floating assembly slidably connected to said casing and having planetary connections with said primary floating assembly, said driven assembly and said drive shaft pinion means, means responsive to the speed of said drive shaft to lock one of said floating assemblies against rotation in one direction to cause low ratio rotation of said driven shaft, and manually operable means to lock the other of said floating assemblies against rotation in the opposite direction to cause low ratio rotation of said driven shaft in reverse direction, or to release both said floating assemblies for rotation of said drive shaft, casing, and floating assemblies without rotation of said driven shaft.

5. In a power transmission unit, coaxial drive and driven shafts, means providing gear connection therebetween comprising a floating assembly having planetary connection with said drive shaft and said driven shaft, a closed fluid containing casing splined to the assembly and slidable on said drive shaft, and a second floating assembly in said casing having planetary connection with said driven shaft and with said first floating assembly.

6. In a power transmission unit, coaxial drive and driven shafts, means providing gear connection therebetween comprising a floating assembly having planetary connection with said drive shaft and said driven shaft, a closed fluid containing casing splined to the assembly and slidable on said drive shaft, and a second floating assembly in said casing having planetary connection with said driven shaft and with said first floating assembly, said drive shaft having fluid supply means communicating with the interior of said casing to compensate for leakage therefrom.

7. In a power transmission unit, coaxial drive and driven shafts, means providing gear connection therebetween comprising a floating assembly having planetary connection with said drive shaft and said driven shaft, a closed fluid containing casing splined to the assembly and slidable on said drive shaft, and a second floating assembly in said casing having planetary connection with said driven shaft and with said first floating assembly, certain of said planetary connections forming a pair of pumps adapted to vary the relative speed of said floating assemblies provided by said gear connections.

8. In a power transmission unit, coaxial drive and driven shafts, means providing gear connection therebetween comprising a floating assembly having planetary connection with said drive shaft and said driven shaft, a closed fluid containing casing splined to the assembly and slidable on said drive shaft, and a second floating assembly in said casing having planetary connection with said driven shaft and with said first floating assembly, certain of said planetary connections forming a pair of pumps adapted to vary the relative speed of said floating assemblies provided by said gear connections, and said casing providing means of communication between said pumps whereby their rates of discharge may be varied by slidable adjustment of the casing.

9. In a power transmission unit, coaxial drive and driven shafts, means providing gear connection therebetween comprising a floating assembly having planetary connection with said drive shaft and said driven shaft, a closed fluid containing casing splined to the assembly and slidable on said drive shaft, and a second floating assembly in said casing having planetary connection with said driven shaft and with said first floating assembly, certain of said planetary connections forming a pair of pumps adapted to vary the relative speed of said floating assemblies provided by said gear connections, said casing providing means of communication between said pumps whereby their rates of discharge may be varied by slidable adjustment of the casing, and said drive shaft having fluid supply means communicating with the interior of said casing to compensate for leakage therefrom.

10. In a power transmission unit, coaxial drive and driven shafts, means providing gear connection therebetween comprising a floating assembly having planetary connection with said drive shaft and said driven shaft, a closed fluid containing casing splined to the assembly and slidable on said drive shaft, a second floating assembly in said casing having planetary connection with said driven shaft and with said first floating assembly, certain of said planetary connections forming a pair of pumps adapted to vary the relative speed of said floating assemblies provided by said gear connections, and said casing providing means of communication between said pumps whereby their rates of discharge may be varied by slidable adjustment of the casing, means responsive to the acceleration of the speed of rotation of said drive shaft to automatically slidably adjust said casing to accelerate the speed of said driven shaft.

11. In a power transmission unit, coaxial drive and driven shafts, means providing gear connection therebetween comprising a floating assembly having planetary connection with said drive shaft and said driven shaft, a closed fluid containing casing splined to the assembly and slidable on said drive shaft, a second floating assembly in said casing having planetary connection with said driven shaft and with said first floating assembly, certain of said planetary connections forming a pair of pumps adapted to vary the relative speed of said floating assemblies provided by said gear connections, said casing providing means of communication between said pumps whereby their rates of discharge may be varied by slidable adjustment of the casing, and said drive shaft having fluid supply means communicating with the interior of said casing to compensate for leakage therefrom, and means comprising a spring loaded flyball governor responsive to the acceleration of the speed of rotation of said drive shaft to automatically slidably adjust said casing to accelerate the speed of said driven shaft.

12. In a transmission unit, a power input member, a floating assembly having planetary connection therewith, a power output member coaxial with said power input member, a second floating assembly having planetary connection with said power output member, and with said first assembly, locking roller brake means operatively connected to said second floating assembly, and fluid pumps formed by the interconnecting floating assemblies, whereby to vary the speed ratio between said power input and power output members.

13. In a power transmission unit, a power input member, a floating assembly having planetary connection therewith, a power output member coaxial with said power input member, a second floating assembly having planetary connection with said power output member and with said first assembly, locking roller brake means operatively connected to said second floating assembly and fluid pump means formed by the planetary interconnection between said floating assemblies and said power input and output members adapted automatically to vary the speed ratio provided by the gear connection between said power input and power output members.

14. In a power transmission unit, a power input member, a floating assembly having planetary conection therewith, a power output member coaxial with said power input member, a second floating assembly having planetary connection with said power output member and with said first assembly, locking roller brake means operatively connected to said second floating assembly, fluid pump means formed by the planetary interconnection between said floating assemblies and said power input and output members adapted automatically to vary the speed ratio provided by the gear connection between said power input and power output members, a fluid carrying casing surrounding said input and output members and said assemblies, and means in said power input member for supplying fluid to said casing to compensate for leakage of fluid therefrom.

15. In a transmission unit, an engine drive shaft, a driven shaft, a fluid containing casing slidable thereon, said casing having longitudinal fluid passages therein, planetary assemblies in said casing forming a pair of gear pumps having fluid passages communicating with the fluid passages in said casing, and means for sliding said casing to reduce or close off the discharge passages between said pumps and the longitudinal fluid passages whereby to vary the output differential between said pumps and the ratio between said drive shaft and said driven shaft.

16. In a transmission unit, an engine drive shaft, a driven shaft, a fluid containing casing slidable and rotatable thereon, said casing having longitudinal fluid passages therein, planetary assemblies in said casing forming a pair of gear pumps in tandem having fluid passages communicating with the fluid passages in said casing, and means responsive to the speed of rotation of said fluid containing casing for automatically sliding said casing to reduce or close off the discharge passages between said pumps and the longitudinal fluid passages in said casing whereby to vary the output differential between said pumps and the ratio between said drive shaft and said driven shaft.

17. In a transmission unit, an engine drive shaft, a driven shaft, a fluid containing casing slidable and rotatable thereon, said casing having longitudinal fluid passages therein and a spring loaded fly ball governor attached thereto for rotation therewith, a plurality of planetary assemblies in said casing forming a pair of gear pumps having fluid passages communicating with the fluid passages in said casing, said governor being responsive to the speed of rotation of said casing to slidably position said casing to reduce or close off the communicating passages between said pumps and the longitudinal fluid passages in said casing whereby to vary the output differential between said pumps, the ratio between said assemblies, and between said drive shaft and said driven shaft.

18. In a transmission unit, an engine drive shaft, a driven shaft, a fluid containing casing slidable thereon, said casing having longitudinal fluid passages therein, planetary assemblies in said casing forming a pair of gear pumps and passages communicating between said pumps and the fluid passages in said casing, means for sliding said casing with respect to said assemblies to reduce the communicating passages between said pumps and the longitudinal fluid passages in said casing, and means for compensating for leakage from said casing comprising a passage in said drive shaft connected to a lubricating system and having communication with the interior of said casing.

19. In a transmission unit having a drive shaft and pinion, a driven shaft and driven assembly, and a surrounding casing having fluid passages extending from one end portion to the other end portion; a pair of floating assemblies, one of said floating assemblies having splined connection with said casing and planetary connection with said pinion, said second floating assembly, and said driven assembly, said second floating assembly also having planetary connection with said driven assembly, the planetary connection between said first floating assembly, said pinion and said second floating assembly forming a gear pump adapted to pump fluid, and the planetary connection between said driven assembly, said first floating assembly, and said second floating assembly forming a gear pump in tandem with said first pump and adapted to pump fluid, said fluid gear pumps having communication through the fluid passages in said casing, whereby differences in fluid output between the pumps will vary the relative speed between said floating assemblies.

20. In a transmission unit having a drive shaft and pinion, a driven shaft and driven assembly, and a surrounding casing having fluid passages extending from one end portion to the other end portion; a pair of floating assemblies, one of said floating assemblies having splined connection with said casing and planetary connection with said pinion, said second floating assembly, and said driven assembly, said second floating assembly also having planetary connection with said driven assembly, the planetary connection between said first floating assembly, said pinion and said second floating assembly forming a gear pump adapted to pump fluid, and the planetary connection between said driven assembly, said first floating assembly and said second floating assembly forming a gear pump in tandem with said first pump and adapted to pump fluid, said floating assemblies having fluid passages adapted to communicate with the fluid passages in said casing, and said casing being slidable on said drive shaft and said driven shaft for blocking some of said passages whereby to change the output of said pumps and change the rate of relative rotation between said floating assemblies and between said drive shaft and said driven shaft.

21. In a transmission unit having a drive shaft and pinion, a driven shaft and driven assembly, and a surrounding casing having fluid passages extending from one end portion to the other end portion; a pair of floating assemblies, one of said floating assemblies having splined connection with said casing and planetary connection with said pinion, said second floating assembly, and said driven assembly, said second floating assembly also having planetary connection with said driven assembly, the planetary connection between said first floating assembly, said pinion and said second floating assembly forming a gear pump adapted to pump fluid, and the planetary connection between said driven assembly, said first floating assembly and said second floating assembly forming a gear pump in tandem with said first pump and adapted to pump fluid, said floating assemblies having fluid passages adapted to communicate with the fluid passages in said casing, and said casing being slidable with respect to said drive and driven shafts and having centrifugal governor means associated therewith and responsive to the speed of rotation thereof for slidably positioning said casing to block some of said passages, whereby to decrease the output of said pumps and automatically change the rate of relative rotation between said floating assemblies and between said drive shaft and said driven shaft.

22. In a transmission unit, coaxially disposed drive and driven shafts, a fluid containing casing slidable and rotatable with respect to said shafts, planetary gearing and pump means in said casing and providing means of connection between said drive shaft and said driven shaft, means for compensating for leakage from said casing comprising a fluid passage in said drive shaft having unidirectional communication with the interior of said casing, means connected with said casing for causing low ratio gear connection between said drive shaft and said driven shaft, means for slidably positioning said casing for high ratio connection between said shafts, and means of communication in said casing between said pump means responsive to the sliding movement of said casing to gradually vary the speed ratio betwen said drive shaft and said driven shaft, between low ratio and high ratio positions of said casing.

23. In a transmission unit, coaxially disposed drive and driven shafts, a fluid containing casing slidable and rotatable with respect to said shafts, planetary gearing and pump means in said casing and providing means of connection between said drive shaft and said driven shaft, means for compensating for leakage from said casing comprising a fluid passage in said drive shaft having unidirectional communication with the interior of said casing, means connected with said casing for causing low ratio gear connection between said drive and said driven shafts, means for slidably positioning said casing for high ratio connection between said shafts, and means of communication in said casing between said pump means responsive to the sliding movement of said casing to gradually vary the speed ratio between said drive shaft and said driven shafts, between low ratio and high ratio positions of said casing, the means for slidably positioning said casing comprising a spring loaded flyball governor attached to said casing and responsive to the speed of rotation thereof.

24. In an automatic transmission unit, a drive shaft having pinion means and jaw clutch means thereon, a casing having jaw clutch means adapted to be engaged with said first jaw clutch means for high ratio connection, said casing being slidably and rotatably supported on said drive shaft and normally resiliently urged in a direction to separate said jaw clutch means, a driven shaft rotatable with respect to said casing and having a driven assembly rotatable therewith and disposed in said casing, a primary floating assembly in said casing having a planetary connection with said driven assembly, a secondary floating assembly in said casing having planetary connections with said primary floating assembly, said driven assembly and said drive shaft pinion means, speed responsive means to lock one of said floating assemblies against rotation in one direction to cause low ratio rotation of said driven shaft, manually operable means to lock the other of said floating assemblies against rotation in the opposite direction to cause low ratio rotation of said driven shaft in reverse direction, or to release both said floating assemblies for rotation of said drive shaft, casing, and floating assemblies without rotation of said driven shaft. and means responsive to the speed of rotation of said casing, when one of said floating assemblies is locked against rotation in one direction to automatically slide said casing axially of said drive shaft to engage said complementary jaw clutch means for high ratio rotation of said driven shaft.

25. In an automatic transmission unit, a drive shaft having pinion means and jaw clutch means, a driven shaft having a driven assembly thereon, a primary floating assembly rotatable with respect to said driven shaft and having planetary connection with said driven assembly, a secondary floating assembly including a flanged spider provided with fluid passages and having planetary connection with said pinion means, said primary floating assembly and with said driven assembly, a casing surrounding said pinion, said driven assembly, and said primary and secondary floating assemblies, said casing being rotatably and slidably supported on said drive shaft and splined to said secondary floating assembly, said casing having jaw clutch means adapted to engage the jaw clutch means on said drive shaft and resilient means adapted normally to separate said jaw clutch means for low ratio operation, said casing having axial fluid passages adapted to provide communication between opposite ends thereof, and said planetary connection between said driven, primary and secondary assemblies providing a pair of gear pumps, means for locking said primary floating assembly against rotation in one direction to cause low ratio rotation of said driven shaft in one direction, means for independently locking said secondary floating assembly against rotation in the opposite direction for low ratio rotation of said driven shaft in the opposite direction, and means for slidably moving said casing against said resilient means to engage the clutch jaw means thereon with the clutch jaw means on the drive shaft for high ratio operation of said driven shaft.

26. In an automatic transmission unit, a drive shaft having pinion means and jaw clutch means, a driven shaft having a driven assembly thereon, a primary floating assembly rotatable with respect to said driven assembly, a secondary floating assembly including a flanged spider provided with fluid passages and having planetary connection with said primary floating assembly and with said driven assembly, a casing surrounding said pinion, said driven assembly, and said primary and secondary floating assemblies, said casing being rotatably and slidably supported on said drive shaft and splined to said secondary floating assembly, said casing having jaw clutch means adapted to engage the jaw clutch means on said drive shaft and resilient means adapted normally to separate said jaw clutch means for low ratio operation, said casing having axial fluid passages adapted to provide communication bewteen opposite ends thereof, and said plentary connection between said driven, primary and secondary assemblies providing a pair of gear pumps, means for locking said primary floating assembly against rotation in one direction to cause low ratio rotation of said driven shaft in one direction, means for independently locking said secondary floating assembly against rotation in the opposite direction for low ratio rotation of said driven shaft in the opposite direction, and means including a spring loaded centrifugal governor for automatically slidably moving said casing against said resilient means to engage the clutch jaw means thereon with the jaw clutch means on said drive shaft for high ratio rotation of said driven shaft.

27. In an automatic transmission unit, a drive shaft having pinion means and jaw clutch means, a driven shaft having a driven assembly thereon, a primary floating assembly rotatable with respect to said driven shaft and having planetary connection with said driven assembly, a secondary floating assembly including a flanged spider provided with fluid passages and having planetary connection with said primary floating assembly and with said driven assembly, a casing surrounding said pinion, said driven assembly, and said primary and secondary floating assemblies, said casing being rotatably and slidably supported on said drive shaft and splined to said secondary floating assembly, said casing having jaw clutch means adapted to engage the jaw clutch means on said drive shaft and resilient means adapted normally to separate said jaw clutch means for low ratio operation, said casing having axial fluid passages adapted to provide communication between opposite ends thereof, and said planetary connection between said driven, primary and secondary assemblies providing a pair of gear pumps, means for locking said primary floating assembly against rotation in one direction to cause low ratio rotation of said driven shaft in one direction, means for independently locking said secondary floating assembly against rotation in the opposite direction for low ratio rotation of said driven shaft in the opposite direction, and means responsive to the speed of rotation of said casing for automatically slidably moving said casing against said resilient means to engage the clutch jaw means thereon with the jaw clutch means on the drive shaft for high ratio rotation, said means being adapted to automatically lock one of said floating assemblies whereby the pumping action of the planetary gear means due to relative rotation between the respective assemblies will cause gradual acceleration between low and high speed ratios.

28. In an automatic transmission unit, a drive shaft having pinion means and jaw clutch means, a driven shaft having a driven assembly thereon, a primary floating assembly rotatable with respect to said driven shaft and having planetary connection with said driven assembly, a secondary floating assembly including a flanged spider provided with fluid passages and having planetary connection with said primary floating assembly and with said driven assembly, a casing surrounding said pinion, said driven assembly, and said primary and secondary floating assemblies, said casing being rotatably and slidably supported on said drive shaft and splined to said secondary floating assembly, said casing having jaw clutch means adapted to engage the jaw clutch means on said drive shaft and resilient means adapted normally to separate said jaw clutch means for low ratio operation, said casing having axial fluid passages adapted to provide communication between opposite ends thereof, and said planetary connection between said driven, primary and secondary assemblies providing a pair of gear pumps, means for locking said primary floating assembly against rotation in one direction to cause low ratio rotation of said driven shaft in one direction, means for independently locking said secondary floating assembly against rotation in the opposite direction for low ratio rotation of said driven shaft in the opposite direction, means responsive to the speed of rotation of said casing for automatically slidably moving said casing against said resilient means to engage the clutch jaw means thereon with the jaw clutch means on the drive shaft for high ratio rotation, said means being adapted to automatically lock one of said floating assemblies whereby the pumping action of the planetary gear means due to relative rotation between the respective assemblies will cause gradual acceleration between low and high speed ratios, and means for compensating for fluid leakage from said casing comprising a fluid supply passage in said drive shaft, said passage being connected through radial passages, having unidirectional check means, with the interior of said casing and having a connection with an external pressure fluid supply.

29. In a transmission unit, a driving assembly comprising a driving shaft having a drive pinion and jaw clutch thereon, a driven assembly comprising a driven shaft having an integral spider with planetary gearing rotatably supported in recesses therein to form fluid pumps, a primary floating assembly comprising an internal gear, a sun pinion gear, and a clutch disk rigidly connected together, said sun pinion gear being engaged with the planetary gearing of said driven assembly, and a secondary floating assembly comprising a spider having planetary gears supported in recesses therein to form fluid pumps, said planetary gears being operatively connected with said drive pinion and the internal gear of the primary floating assembly, said spider having an internal gear engaging the planetary gears of said driven assembly, a closed fluid retaining casing slidable and rotatable with respect to said driving and driven shafts, splined to the spider of said secondary floating assembly and having jaw clutch means adapted to be engaged with the jaw clutch of said driving assembly, resilient means adapted normally to urge said casing in one direction with respect to said spider and disengage said jaw clutch means, centrifugal governor means connected to said casing and adapted to slidably position said casing, a pair of roller clutches each operatively connected to one of said floating assemblies, and means responsive to the movement of said governor for independently locking one of said clutches against rotation in one direction, the directions of prevented rotation being opposite in each of said clutches.

30. In a transmission unit, a driving assembly comprising a driving shaft having a drive pinion and jaw clutch thereon, a driven assembly comprising a driven shaft having an integral spider with planetary gearing rotatably supported in recesses therein to form fluid pumps, a primary floating assembly comprising an internal gear, a sun pinion gear, and a clutch disk rigidly connected together, said sun pinion gear being engaged with the planetary gearing of said driven assembly, and a secondary floating assembly comprising a spider having planetary gears supported in recesses therein to form fluid pumps, said planetary gears being operatively connected with said drive pinion and the internal gear of the primary floating assembly, said spider having an internal gear engaging the planetary gears of said driven assembly, a closed fluid retaining casing slidable and rotatable with respect to said driving and driven shafts, splined to the spider of said secondary floating assembly and having jaw clutch means adapted to be engaged with the jaw clutch of said driving assembly, resilient means adapted normally to urge said casing in one direction with respect to said spider and disengage said jaw clutch means, centrifugal governor means connected to said casing and adapted to slidably position said casing, a pair of roller clutches each operatively connected to one of said floating assemblies, and means responsive to the movement of said governor for independently locking one of said clutches against rotation in one direction, the directions of prevented rotation being opposite in each of said clutches, said gear pumps formed by said planetary gearing being adapted, upon relative rotation between said assemblies when one of said floating assemblies is locked against rotation in one direction, to cause movement of the fluid in said casing to gradually increase the speed of rotation of said driven shaft between low ratio and high ratio.

31. In a transmission unit, a driving assembly comprising a driving shaft having a drive pinion and jaw clutch thereon, a driven assembly comprising a driven shaft having an integral spider with planetary gearing rotatably supported in recesses therein to form fluid pumps, a primary floating assembly comprising an internal gear, a sun pinion gear, and a clutch disk rigidly connected together, said sun pinion gear being engaged with the planetary gearing of said driven assembly, and a secondary floating assembly comprising a spider having planetary gears supported in recesses therein to form fluid pumps, said planetary gears being operatively connected with said drive pinion and the internal gear of the primary assembly, said spider having an internal gear engaging the planetary gears of said driven assembly, a closed fluid retaining casing slidable and rotatable with respect to said driving and driven shafts, splined to the spider of said secondary floating assembly and having jaw clutch means adapted to be engaged with the jaw clutch of said driving assembly, resilient means adapted normally to urge said casing in one direction with respect to said spider and disengage said jaw clutch means, centrifugal governor means connected to said casing and adapted to slidably position casing, a pair of roller clutches each operatively connected to one of said floating assemblies, means responsive to the movement of said governor for independently locking one of said clutches against rotation in one direction, the directions of prevented rotation being opposite in each of said clutches, said gear pumps formed by said planetary gearing being adapted, upon relative rotation between said assemblies when one of said floating assemblies is locked against rotation in one direction, to cause movement of the fluid in said casing to gradually increase the speed of rotation of said driven shaft between low ratio and high ratio, and means to compensate for leakage of fluid from said casing comprising a fluid supply passage in said driving shaft connected to a source of pressure fluid supply and being connected by means of radial passages to the interior of said casing, said radial passages having unidirectional check valve means therein adapted to retain fluid in said casing against escape through said radial passages to the passage in said driving shaft.

32. In a transmission unit, a drive assembly including a drive shaft, a driven assembly including a driven shaft, a pair of floating assemblies having planetary connection therebetween, one of said assemblies having planetary connection with said driven assembly, the other of said floating assemblies having planetary connection with said driven assembly, with said first floating assembly and said drive assembly, said planetary connections forming a pair of fluid pumps, a fluid containing casing slidably and rotatably supported on said drive shaft and said driven shaft, said casing having axial fluid passages communicating through annular recesses with fluid passages leading to said planetary connections between said assemblies, means for locking one of said floating assemblies against rotation in one direction whereby to cause relative rotation between said assemblies, and means to vary the outputs of said fluid pumps whereby to vary the ratio of relative rotation between said floating assemblies.

33. In a transmission unit, a drive assembly including a drive shaft, a driven assembly including a driven shaft, a pair of floating assemblies having planetary connection therebetween, one of said assemblies having planetary connection with said driven assembly, the other of said floating assemblies having planetary connection with said driven assembly, with said first floating assembly and said drive assembly, said planetary connections forming a pair of fluid pumps, a fluid containing casing slidably and rotatably supported on said drive shaft and said driven shaft, said casing having axial fluid passages communicating through annular recesses with fluid passages leading to said planetary connections between said assemblies, means for locking one of said floating assemblies against rotation in one direction whereby to cause relative rotation between said assemblies, and speed responsive means adapted automatically to slidably position said casing to vary the output of said fluid pumps whereby to vary the ratio of relative rotation between said floating assemblies and between said drive assembly and said driven assembly.

34. In an automatic transmission, the combination of a driving assembly, a primary floating assembly operatively connected to said driving assembly, a second floating assembly operatively connected to said primary floating assembly, a driven assembly operatively connected to said second floating assembly, said primary, secondary, and driven assemblies providing fluid pumps in tandem therebetween, a fluid containing casing surrounding said assemblies and slidable with respect thereto, and a control assembly operatively connected to said casing for slidably moving said casing with respect to said assemblies for controlling the relative speed of rotation therebetween.

35. In a power transmission unit, coaxial drive and driven shafts, means providing gear connection therebetween comprising a floating assembly having planetary connection with said drive shaft, having a closed fluid containing casing splined to the assembly and slidable on said drive shaft, a second floating assembly in said casing having planetary connection with said driven shaft and with said first floating assembly, said planetary connections forming a pair of gear pumps in tandem adapted to vary the relative speed of said floating assemblies provided by said gear connections, and said casing providing means of communication between said pumps whereby their rates of discharge may be varied by slidable adjustment of the casing, centrifugal governor means responsive to the speed of rotation of said drive shaft to automatically slidably adjust said drive casing to control acceleration of the speed of said driven shaft, and manual means including a neutral treadle arm having thereon a hook member adapted to be engaged in a notch slidable by said governor means to prevent slidable movement of said notch to render said governor ineffective to slidably adjust said casing.

36. In a power transmission unit, coaxial drive and driven shafts, means providing gear connection therebetween comprising a floating assembly having planetary connection with said drive shaft, having a closed fluid containing casing splined to the assembly and slidable on said drive shaft, a second floating assembly in said casing having planetary connection with said driven shaft and with said first floating assembly, said planetary connections forming a pair of gear pumps in tandem adapted to vary the relative speed of said floating assemblies provided by said gear connections, and said casing providing means of communication between said pumps whereby their rates of discharge may be varied by slidable adjustment of the casing, centrifugal governor means responsive to the speed of rotation of said drive shaft to automatically slidably adjust said drive casing to control acceleration of the speed of said driven shaft, and manual means including a neutral treadle arm having thereon a hook member adapted to be engaged in a notch slidable by said governor means to prevent slidable movement of said notch to render said governor ineffective to slidably adjust said casing, whereby, by engagement of said hook member with said notch, the governor is made non-responsive to the speed of rotation of said drive shaft and the speed of said drive shaft may be accelerated without affecting said driven shaft.

37. In automatic transmission means including a drive assembly, a floating assembly operatively connected to said drive assembly, and a second floating assembly forming a fluid pump with the first floating assembly, a driven assembly operatively connected to said second floating assembly and forming a fluid pump with the first floating assembly, and means including a centrifugal governor and a foot pedal operatively connected thereto for controlling the discharge of said fluid pumps formed by said floating assemblies, said foot pedal being adapted to provide control of the discharge of said fluid pumps independently of the action of said centrifugal governor, and a second foot pedal associated with said fluid pump control means and adapted to be depressed in cooperation with said first-named pedal to permit reversing the direction of rotation of said driven assembly, said second foot pedal preventing depression of said first foot pedal into its reverse position, when the transmission means is operating forwardly.

FREDERICK W. SEYBOLD.